United States Patent
Tipirneni

(10) Patent No.: US 9,268,398 B2
(45) Date of Patent: Feb. 23, 2016

(54) VIRTUAL MEETING PLACE SYSTEM AND METHOD

(75) Inventor: Kishore Tipirneni, Glendale, AZ (US)

(73) Assignee: VOISPOT, LLC, Boca Raton, FL (US)

(*) Notice: Subject to any disclaimer, the term of this patent is extended or adjusted under 35 U.S.C. 154(b) by 404 days.

(21) Appl. No.: 13/603,670

(22) Filed: Sep. 5, 2012

(65) Prior Publication Data

US 2012/0331401 A1 Dec. 27, 2012

Related U.S. Application Data

(63) Continuation-in-part of application No. 12/750,989, filed on Mar. 31, 2010, now Pat. No. 8,887,069.

(60) Provisional application No. 61/165,047, filed on Mar. 31, 2009.

(51) Int. Cl.
*G06F 3/01* (2006.01)
*G06F 3/048* (2013.01)
*G06F 17/30* (2006.01)
*H04L 12/18* (2006.01)

(52) U.S. Cl.
CPC ............ *G06F 3/011* (2013.01); *G06F 3/048* (2013.01); *G06F 17/30864* (2013.01); *H04L 12/1822* (2013.01)

(58) Field of Classification Search
CPC ..... G06F 21/32; G06F 3/04842; G06F 3/048; H04L 67/22; H04L 12/1831; G06Q 10/103; H04N 21/44218; H04N 7/15
See application file for complete search history.

(56) References Cited

U.S. PATENT DOCUMENTS

| | | | | |
|---|---|---|---|---|
| 5,539,741 A * | 7/1996 | Barraclough et al. | ........ | 370/267 |
| 5,983,192 A * | 11/1999 | Botzko et al. | ................. | 704/500 |
| 6,457,043 B1 * | 9/2002 | Kwak et al. | ................... | 709/204 |
| 6,901,448 B2 | 5/2005 | Zhu et al. | | |
| 6,938,069 B1 | 8/2005 | Narayanaswamy | | |
| 7,313,593 B1 * | 12/2007 | Pulito et al. | ................... | 709/204 |
| 7,499,969 B1 * | 3/2009 | van Os et al. | ................. | 709/203 |
| 7,603,626 B2 * | 10/2009 | Williams et al. | .............. | 715/751 |
| 8,121,277 B2 * | 2/2012 | Baird | ....................... | 379/202.01 |
| 8,159,519 B2 | 4/2012 | Kurtz et al. | | |
| 8,516,105 B2 * | 8/2013 | Chawla et al. | ................ | 709/224 |
| 2001/0025299 A1 | 9/2001 | Chang et al. | | |
| 2003/0227479 A1 * | 12/2003 | Mizrahi et al. | ................ | 345/753 |
| 2004/0107249 A1 | 6/2004 | Moser et al. | | |
| 2005/0138560 A1 | 6/2005 | Lee et al. | | |
| 2005/0268242 A1 * | 12/2005 | White | .......................... | 715/751 |

(Continued)

OTHER PUBLICATIONS

Archive for May 12, 2009, http://nxpfs.wordpress.com/2009/05/12, "What are Different Types of Federations?", posted by Farzin Shahidi on May 12, 2009.

(Continued)

*Primary Examiner* — Amy M Levy
(74) *Attorney, Agent, or Firm* — Snell & Wilmer L.L.P.

(57) ABSTRACT

A virtual meeting place system is disclosed. The online virtual meeting place facilitates initiating, scheduling, or spontaneously organizing an online discussion or meeting, organizing the discussion into active and passive participants, limiting or eliminate participation of selected participants and soliciting, receiving and answering questions. The system is configurable to allow for customization based upon the social protocols or preferences of meeting participants and may present different user interfaces based upon participant identity, meeting topic or meeting format.

26 Claims, 2 Drawing Sheets

(56) References Cited

U.S. PATENT DOCUMENTS

| | | | |
|---|---|---|---|
| 2006/0026207 A1* | 2/2006 | Sakai et al. | 707/104.1 |
| 2006/0080614 A1* | 4/2006 | Lentz | 715/753 |
| 2006/0247045 A1* | 11/2006 | Jeong et al. | 463/35 |
| 2006/0252547 A1 | 11/2006 | Mizrahi et al. | |
| 2006/0277255 A1* | 12/2006 | Orsolini et al. | 709/205 |
| 2007/0067387 A1 | 3/2007 | Jain et al. | |
| 2007/0100939 A1* | 5/2007 | Bagley et al. | 709/204 |
| 2007/0281723 A1* | 12/2007 | Chotai et al. | 455/518 |
| 2008/0117838 A1* | 5/2008 | Yee et al. | 370/260 |
| 2008/0133660 A1 | 6/2008 | Salesky et al. | |
| 2008/0244419 A1 | 10/2008 | Kurpick et al. | |
| 2009/0019374 A1 | 1/2009 | Logan et al. | |
| 2009/0088215 A1* | 4/2009 | Caspi et al. | 455/563 |
| 2009/0099845 A1 | 4/2009 | George | |
| 2009/0157672 A1 | 6/2009 | Vemuri | |
| 2009/0204906 A1* | 8/2009 | Irving | 715/753 |
| 2009/0210789 A1* | 8/2009 | Thakkar et al. | 715/719 |
| 2010/0005142 A1 | 1/2010 | Xiao et al. | |
| 2010/0125353 A1 | 5/2010 | Petit-Huguenin | |
| 2010/0227546 A1* | 9/2010 | Shusman | 455/2.01 |
| 2010/0250252 A1* | 9/2010 | Yasoshima | 704/246 |
| 2010/0251140 A1 | 9/2010 | Tipirneni | |
| 2011/0271209 A1* | 11/2011 | Jones et al. | 715/753 |
| 2011/0271210 A1* | 11/2011 | Jones et al. | 715/753 |
| 2011/0283008 A1* | 11/2011 | Smelyansky | 709/231 |
| 2012/0030197 A1* | 2/2012 | Attias | 707/723 |
| 2012/0042266 A1* | 2/2012 | Sotropa | 715/753 |
| 2013/0144619 A1* | 6/2013 | Lord et al. | 704/235 |
| 2013/0268598 A1 | 10/2013 | Tipirneni | |
| 2013/0346084 A1* | 12/2013 | Archambault et al. | 704/275 |
| 2014/0109210 A1* | 4/2014 | Borzycki et al. | 726/7 |

OTHER PUBLICATIONS

Yahoo! Live from Wikipedia, the free encyclopedia, http://en.wikipedia.org/wiki/Yahoo! Live, "The service was closed on Dec. 8, 2008."
Non-final rejection mailed Jul. 6, 2012 in U.S. Appl. No. 12/750,989.
Office Action dated Mar. 20, 2014 in U.S. Appl. No. 12/750,989.
Final Office Action dated May 2, 2014 in U.S. Appl. No. 12/750,989.
Advisory Action dated Jul. 8, 2014 in U.S. Appl. No. 12/750,989.
Office Action dated Sep. 23, 2013 in U.S. Appl. No. 12/750,989.
Final Office Action dated Oct. 28, 2013 in U.S. Appl. No. 12/750,989.
Final Office Action dated Oct. 15, 2012 in U.S. Appl. No. 12/750,989.
Citrix. GoToWebinar™ User Guide. © 2008 Citrix Online, LLC.
Advisory Action dated Dec. 31, 2013 in U.S. Appl. No. 12/750,989.
Advisory Action dated Dec. 28, 2012 in U.S. Appl. No. 12/750,989.
Notice of Allowance dated Oct. 1, 2014 in U.S. Appl. No. 12/750,989.

* cited by examiner

VIRTUAL MEETING PLACE SYSTEM AND METHOD

CROSS REFERENCE TO RELATED APPLICATIONS

This application is a continuation-in-part of, and claims priority to, U.S. application Ser. No. 12/750,989, entitled "VIRTUAL MEETING PLACE SYSTEM AND METHOD" and filed on Mar. 31, 2010. The '989 application claims priority to U.S. Provisional Application Ser. No. 61/165,047, entitled "VIRTUAL MEETING PLACE SYSTEM AND METHOD" and filed Mar. 31, 2009. Both of these applications are incorporated by reference in their entirety for all purposes.

FIELD OF DISCLOSURE

The present disclosure generally relates to enabling virtual meeting, and more particularly, to providing a virtual meeting place that facilitates traditional paradigms of interaction and the social protocols associated with traditional communication methods.

BACKGROUND

The internet has revolutionized the way that people communicate. In many instances, old systems of communication, along with the modes and social customs associated with these systems, have become outdated. The speed and convenience provided by interne enabled communication is an undeniable benefit. However, at the same time, traditional paradigms of interaction and the social protocols associated with traditional communication methods have also been lost. For many, the inability of typical internet communication mediums to provide an environment reflecting such time tested communication modes detracts from the utility and enjoyment of communicating.

Thus, a long-felt need exists to provide a virtual meeting place with voice capability that combines the speed and convenience of internet communication with enhanced functionality such as the ability to organically organize discussions, control access and participation in discussions, selectively join or sample a discussion, and spawn a new discussion.

SUMMARY

The present disclosure enables a virtual meeting place. Virtual meeting place systems and methods enable users to interact online while observing traditional paradigms of interaction and the social protocols associated with traditional communication methods. For example, meetings or discussions may be initiated or created similar to the way people meet on the streets of their home town and strike up a conversation. Custom controls allow meeting participants to exclude or limit input from others and/or eliminate undesirable participants from attendance.

In various embodiments, a computer enabled virtual meeting system (VMS) receives, from a first participant, a request to create a meeting wherein the meeting is associated with a user interface and a plurality of participants. The VMS assigns a first participant type to the first participant (i.e., VMS user). The VMS receives a first attendance request from a second participant for access to the meeting and assign a first participant type to the first participant. The VMS receives first input from the first participant and determines, based upon the second participant type, that the second participant should receive the first input. In various embodiments, based upon the second participant type, input received from the second participant may not be sent to the first participant.

BRIEF DESCRIPTION OF THE DRAWINGS

A more complete understanding of the present disclosures may be derived by referring to the detailed description and claims when considered in connection with the Figures, wherein like reference numbers refer to similar elements throughout the Figures, and:

DETAILED DESCRIPTION OF EXEMPLARY EMBODIMENTS

Figure 1:
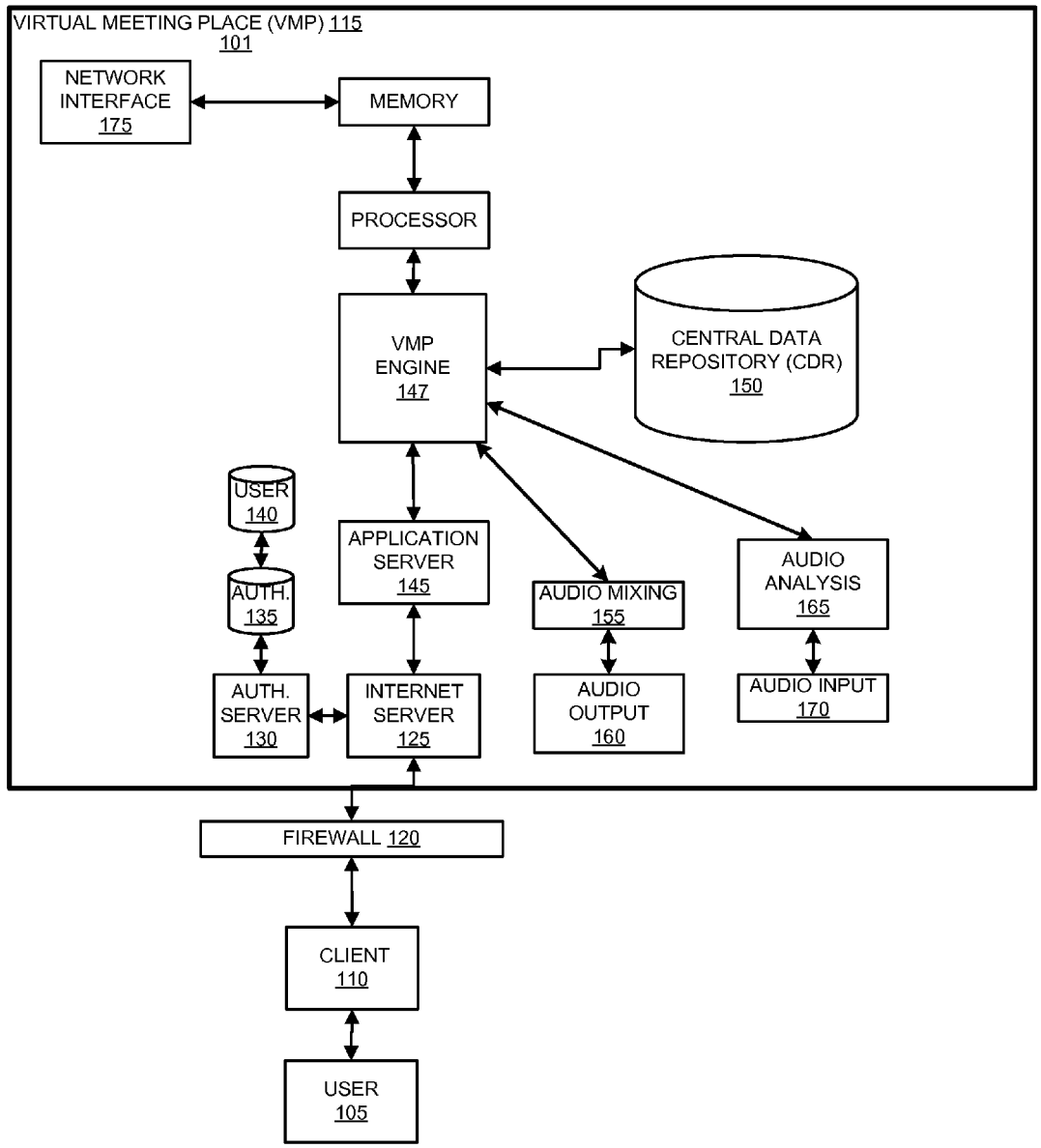
FIG. 1 is a block diagram illustrating major system components for enabling a virtual meeting place, in accordance with various embodiments; and, FIG. 2 is a diagram showing a virtual meeting place interface, in accordance with various embodiments.

The present disclosure fundamentally changes the way people meet and interact on the internet. The disclosure improves upon existing systems by providing a tangible, integrated, online virtual meeting place. The disclosure may be implemented by a system or a method or any combination of systems and methods. The virtual meeting place may allow users to initiate, schedule, or spontaneously organize an online audio discussion, organize the discussion into active and passive participants, limit or eliminate participation of selected participants and solicit, receive and answer questions. In various embodiments, the virtual meeting place enables audio, video and/or text interaction and allows participants to share content. An interface for the virtual meeting place may provide functionality analogous to an auditorium setting.

Although the auditorium setting is used as an analogy to provide a description of the virtual meeting place, one skilled in the art will recognize that, in various embodiments, both the functions and the interface, controls and graphics are configurable to provide a variety of functionality and form. For example, the various embodiments of the virtual meeting place may be implemented to provide communication functions and experiences analogous to a parent teacher conference, an association meeting, an expert question and answer session, a club or association meeting, a nightclub, an academic discussion, a debate, and a consultation with an expert (e.g., legal, medical, computer, etc.).

While the embodiments described herein are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the system includes a user interface (UI), a software module, logic engines, numerous databases and computer networks. While the system may contemplate upgrades or reconfigurations of existing processing systems, changes to existing databases and system tools are not necessarily required by the present disclosure.

The benefits provided by this disclosure include, for example, increased usability, functionality, comfort, familiarity and efficiency in online communications. Individuals benefit from the increased ability to strike up discussions with people sharing the same interests, while having access to controls (e.g., limiting the participation of some users and/or eliminating users from the discussion).

While the description references specific technologies, system architectures and data management techniques, practitioners will appreciate that this description is but one embodiment and that other devices and/or methods may be implemented without departing from the scope of the disclosure. Similarly, while the description references a user interfacing with the system via a personal computer user interface, practitioners will appreciate that other interfaces may include mobile devices, kiosks and handheld devices such as personal digital assistants.

A "user" or "participant" may include any individual, entity, software and/or hardware that interacts with a system and/or participates in a process. With reference to FIG. 1, user 105 may perform tasks such as requesting, retrieving, receiving, updating, analyzing, entering and/or modifying data. User 105 may interface with Internet server 125 via any communication protocol, device or method discussed herein, known in the art, or later developed. User 105 may be any participant in any type of meeting, discussion or user interaction. Such a participant may be, for example, an expert, a professional, a sports enthusiast, a leader of an organization, an outdoorsman, a political junkie, etc.

In various embodiments, with reference to FIG. 1, system 101 includes a user 105 interfacing with a virtual meeting place ("VMP") 115 by way of a client 110. VMP 115 is a fully integrated system comprised of various subsystems, modules and databases. Client 110 comprises any hardware and/or software suitably configured to facilitate requesting, retrieving, updating, analyzing, entering and/or modifying data. The data may include communication data audio, video, text), verification data, authentication data, instructional data, demographic data, transaction data, or any information discussed herein. Client 110 includes any device (e.g., personal computer), which communicates (in any manner discussed herein) with the VMP 115 via any network discussed herein. Browser applications comprise Internet browsing software installed within a computing unit or system to conduct online communications and transactions. These computing units or systems may take the form of personal computers, mobile phones, personal digital assistants, mobile email devices, laptops, notebooks, hand held computers, portable computers, kiosks, and/or the like. Practitioners will appreciate that the client 110 may or may not be in direct contact with the VMP 115. For example, the client 110 may access the services of the VMP 115 through another server, which may have a direct or indirect connection to Internet server 125.

Figure 2:
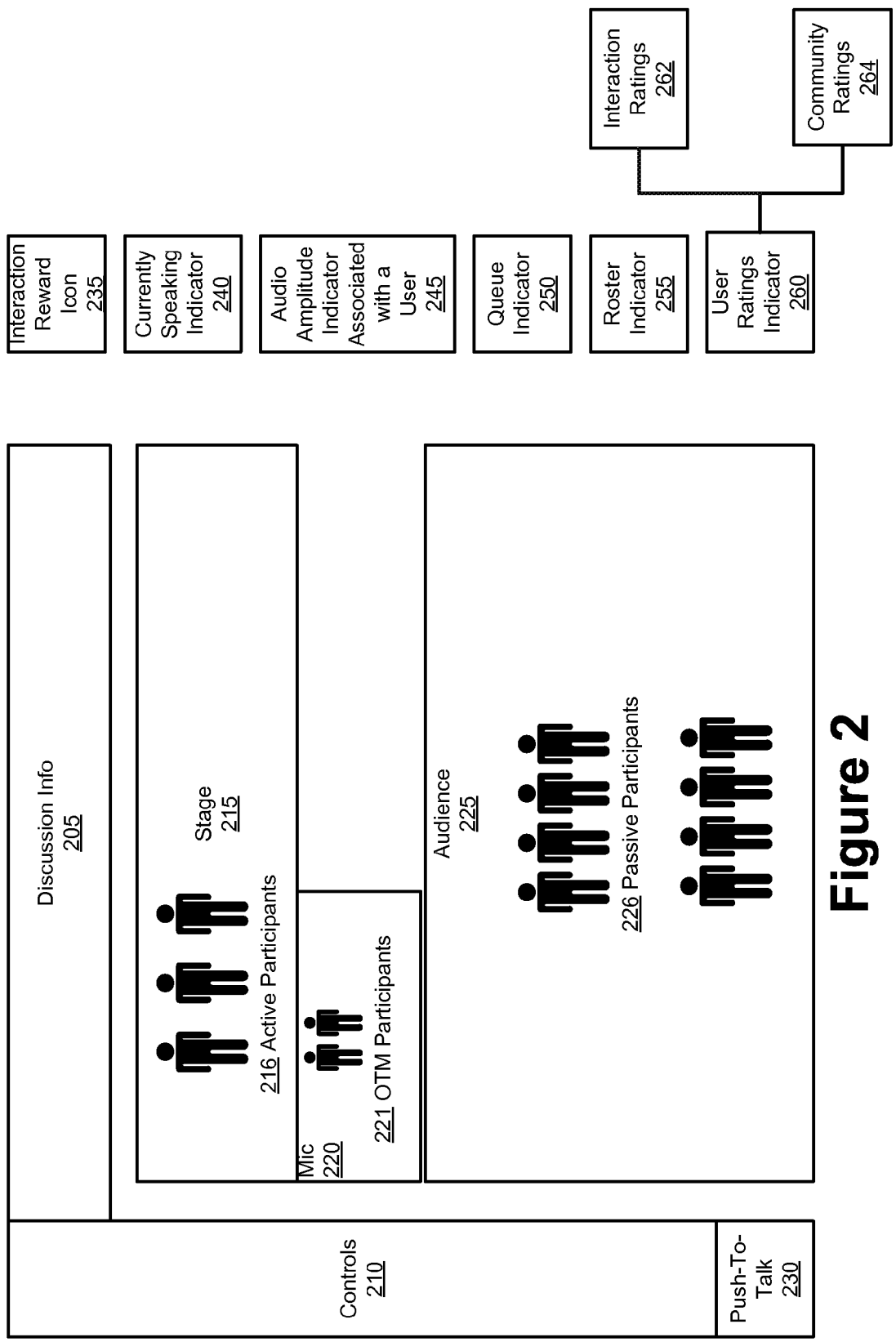

Referring now to FIG. 2, an embodiment of a user interface communicated to user 105 via client 110 is shown. VMP user interface (UI) 201 presents a user with a virtual meeting place and a variety of controls to participate in a discussion. Discussion info 205 shows the parameters associated with the discussion such as the topic, the list of active participants, etc. Controls 210 is an area comprising user controls such as change discussion, scan discussions, ask a question, record the discussion, spawn a new discussion, or vote to remove a participant. The functions associated with these controls will be discussed in detail below.

In various embodiments, UI 201 shows three areas which are associated with users' rights. Users rights may include, for example, user permissions, user roles, user interfaces and controls enabled on a user interface. Stage 215 displays the active participants 216 of a discussion, Mic 220 displays on-the-microphone (OTM) participants 221, and audience 225 displays passive participants 226. Active participants 216 can be heard by all members of the discussion while passive participants 221 may not have the ability to directly participate in the discussion. In various embodiments, OTM participants are quasi-active participants, e.g., users 105 who have limited rights of participation and may be heard by the entire discussion, or by a subset, and whose access to such limited rights is temporary.

Referring again to FIG. 1, user 105 may communicate with the VMP 115 through a firewall 120 to help ensure the integrity of the VMP 115 components. Internet server 125 may include any hardware and/or software suitably configured to facilitate communications between the client 110 and one or more VMP 115 components.

Firewall 120, as used herein, may comprise any hardware and/or software suitably configured to protect VMP 115 components from users of other networks. Firewall 120 may reside in varying configurations including stateful inspection, proxy based and packet filtering, among others. Firewall 120 may be integrated as software within Internet server 125, any other system 101 component, or may reside within another computing device or may take the form of a standalone hardware component.

Authentication server 130 may include any hardware and/or software suitably configured to receive authentication credentials, encrypt and decrypt credentials, authenticate credentials, and/or grant access rights according to pre-defined privileges attached to the credentials. Authentication server 130 may grant varying degrees of application and data level access to users based on information stored within authentication database 135 and user database 140. Application server 145 may include any hardware and/or software suitably configured to serve applications and data to a connected client 110.

According to one embodiment, VMP 115 is used to manage and integrate an online or other computer-based meeting place, VMP 115 is a fully integrated system comprised of various subsystems, modules and databases. With reference again to FIG. 1, VMP 115 combines and allows communication with a central data repository ("CDR") 150 and various other portals and UIs (not shown in FIG. 1). In various embodiments, UIs are accessed via a web portal and the elements of the UI may be comprised of movable, resizable web parts. These components are interconnected and communicate with one another to allow for a completely integrated online meeting place that allows users, for example, to initiate, organize, manage, participate in, search for, monitor, and record discussions, debates, speeches or any interaction among users.

Virtual meeting place engine ("VMP Engine") 147 is a software module configured to enable online functions such as receiving query requests, configuring responses, dynamically configuring user interfaces, requesting data, receiving data, displaying data, streaming audio and/or video data, prompting user 105 with security challenges, verifying user responses, authenticating the user, initiating VMP 115 processes, initiating other software modules, encrypting and decrypting. Additionally, VMP Engine 147 may include any hardware and/or software suitably configured to receive requests from client 110 via Internet server 125 and the application server 145, VMP Engine 147 is further configured to process requests, execute transactions, construct database queries, and/or execute queries against databases, within system 101 (e.g., central data repository ("CDR") 150), external data sources 161 and temporary databases.

VMP Engine 147 is configured to exchange data with other systems and application modules. In various embodiments, the VMP Engine 147 may be configured to interact with other system 101 components to perform complex calculations, retrieve additional data, format data into reports, create XML representations of data, construct markup language documents, construct, define or control UIs, and/or the like. Moreover, VMP Engine 147 may reside as a standalone system or may be incorporated with the application server 145 or any other VMP 115 component as program code. As one of ordinary skill in the art will appreciate, VMP Engine 147 may be logically or physically divided into various subcomponents such as a workflow engine configured to evaluate predefined rules and to automate processes associated with a virtual meeting place implemented in VMP 115.

In addition to the components described above, system 101, and VMP 115 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

As will be appreciated by one of ordinary skill in the art, one or more system 101 components may be embodied as a customization of an existing system, an add-on product, upgraded software, a stand-alone system (e.g., kiosk), a distributed system, a method, a data processing system, a device for data processing, and/or a computer program product. Accordingly, individual system 101 components may take the form of an entirely software embodiment, an entirely hardware embodiment, or an embodiment combining aspects of both software and hardware. Furthermore, individual system 101 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Client 110 may include an operating system (e.g., Windows XP, Windows NT, 95/98/2000, XP, Vista, OS2, UNIX, Linux, Solaris, MacOS, Windows Mobile OS, Windows CE, Palm OS, Symbian OS, Blackberry OS, J2ME, etc.) as well as various conventional support software and drivers typically associated with mobile devices and/or computers. Client 110 may be in any environment with access to any network (e.g., via network interface 175), including both wireless and wired network connections. In various embodiments, access is through a network or the Internet through a commercially available web-browser software package. Client 110 and VMP 115 components may be independently, separately or collectively suitably coupled to the network via data links which includes, for example, a connection to an Internet Service Provider (ISP) over the local loop as is typically used in connection with standard wireless communications networks and/or methods, modem communication, cable modem, Dish networks, ISDN, Digital Subscriber Line (DSL), see, e.g., Gilbert Held, Understanding Data Communications (1996). In various embodiments, any portion of client 110 is partially or fully connected to a network using a wired ("hardwire") connection. As those skilled in the art will appreciate, client 110 and/or any of the system components may include wired and/or wireless portions.

In various embodiments, components, modules, and/or engines of system 100 may be implemented as micro-applications or micro-apps. Micro-apps are typically deployed in the context of a mobile operating system, including for example, a Palm® mobile operating system, a Windows mobile operating system, an Android Operating System, Apple iOS, a Blackberry® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

Internet server 125 may be configured to transmit data to client 110 within markup language documents. "Data" may include encompassing information such as commands, transaction requests, queries, files, data for storage, and/or the like in digital or any other form. Internet server 125 may operate as a single entity in a single geographic location or as separate computing components located together or in separate geographic locations. Further, Internet server 125 may provide a suitable web site or other Internet-based graphical user interface, which is accessible by users. In various embodiments, the Microsoft Internet Information Server (IIS), Microsoft Transaction Server (MTS), and Microsoft SQL Server™, are used in conjunction with the Microsoft operating system, Microsoft NT web server software, a Microsoft SQL Server™ database system, and a Microsoft Commerce Server. Additionally, components such as Access or Microsoft SQL Server™, Oracle®, Sybase®, Informix® MySQL, InterBase™, etc., may be used to provide an Active Data Object (ADO) compliant database management system.

Like Internet server 125, application server 145 may communicate with any number of other servers, databases and/or components through any means known in the art. Further, application server 145 may serve as a conduit between client 110 and the various systems and components of VMP 115. Internet server 125 may interface with application server 145 through any means known in the art including a LAN/WAN, for example. Application server 145 may further invoke software modules such as the VMP Engine 147 in response to user 105 requests.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard HTML documents, various forms, Java™ applets, JavaScript®, active server pages (ASP), common gateway interface scripts (CGI), Flash files or modules, FLEX™, ActionScript™, extensible markup language (XML), dynamic HTML, cascading style sheets (CSS), helper applications, plug-ins, and/or the like. A server may include a web service that receives a request from a web server, the request including a URL (e.g., http://yahoo.com/) and an internet protocol ("IP") address. The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003).

FIG. 1 depicts databases that are included in an exemplary embodiment of the disclosure. An exemplary list of various databases used herein includes: an authentication database 135, a user database 140, CDR 150 and/or other databases that aid in the functioning of the system. As practitioners will appreciate, while depicted as separate and/or independent entities for the purposes of illustration, databases residing within system 101 may represent multiple hardware, software, database, data structure and networking components. Furthermore, embodiments are not limited to the exemplary databases described herein, nor do embodiments necessarily utilize each of the disclosed exemplary databases.

Authentication database 135 may store information used in the authentication process such as, for example, user identifiers, passwords, access privileges, user preferences, user statistics, and the like. User database 140 maintains user information and credentials for VMP 115 users (e.g., user 105).

CDR 150 is a data repository that is configured to store a wide variety of comprehensive data for a virtual meeting place. While depicted as a single logical entity in FIG. 1, those of skill in the art will appreciate that CDR 150 may, in some embodiments, consist of multiple physical and/or logical data sources. In various embodiments, CDR 150 stores audio data, video data, configuration data, profile data, historical data, schedules, security profiles, audit records, predefined rules, process definitions, financial data, and the like.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access™ or Microsoft SQL Server™ by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of system 101 may consist of any combination thereof at a single location or at multiple locations, wherein each database or system includes any of various suitable security features, such as firewalls, access codes, encryption, decryption, compression, decompression, and/or the like.

The systems and methods may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java™, JavaScript®, Flash, ActionScript™, FLEX™, VBScript™, Macromedia Cold Fusion™, COBOL, Microsoft Active Server Pages™, assembly, PERL, PHP, awk, Python™, Visual Basic™, SQL Stored Procedures, PL/SQL, any UNIX™ shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript®, VBScript™ or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Referring again to FIG. 1, in various embodiments, in response to user 105 logging onto an application, Internet server 125 may invoke an application server 145. Application server 145 may invoke logic in the VMP Engine 147 by passing parameters relating to the user's 105 requests for data. VMP 115 manages requests for data from VMP Engine 147 and communicates with system 101 components. Transmissions between user 105 and Internet server 125 may pass through a firewall 120 to help ensure the integrity of VMP 115 components. Practitioners will appreciate that the disclosure may incorporate any number of security schemes or none at all. In various embodiments, Internet server 125 receives requests from client 110 and interacts with various other system 101 components to perform tasks related to requests from client 110.

Internet server 125 may invoke an authentication server 130 to verify the identity of user 105 and assign roles, access rights and/or permissions to user 105. In order to control access to the application server 145 or any other component of VMP 115, Internet server 125 may invoke an authentication server 130 in response to user 105 submissions of authentication credentials received at Internet server 125. When a request to access system 101 is received from Internet server 125, Internet server 125 determines if authentication is desired for required) and transmits a prompt to client 110. User 105 enters authentication data at client 110, which transmits the authentication data to Internet server 125. Internet server 125 passes the authentication data to authentication server which queries the user database 140 for corresponding credentials. When user 105 is authenticated, user 105 may access various applications and their corresponding data sources.

As discussed above, with reference to FIG. 2, UI 201 provides a stage 215 where active participants 216 engage in a discussion and an audience 225 for passive participants 226 to listen to the discussion. For example, the active participants 216 are "on the auditorium stage" and the passive participants are "in the audience," in various embodiments, the input provided by active participants 216 (e.g., voice data) is accessible by all members of the discussion (i.e., both active and passive), while passive participants 226 may not have the ability to directly enter data into the discussion. In various embodiments, passive participants may not be able to transmit voice data that can be heard by other participants. However, in various embodiments, passive participants may, by using a control 210 (e.g., click a button, dial a number, etc.), indicate that they wish to offer a comment or ask a question. Passive participant 226 is placed in a queue and may receive an indication of their position in the queue and/or estimated wait time. Passive participant 226 is converted to an OTM participant 221 in the discussion and may actively interact (e.g., via audio communication) with the other active participants.

The number of active participants 216, passive participants 226 and quasi active (e.g., OTM participants 221) may be unrestricted. However, in various embodiments, the number of OTM participants 221 is a finite number. Such a configuration is analogous to an auditorium, setting where a number of microphones are provided for members of the audience to ask questions to the discussion participants on stage. In various embodiments, a passive participant 226 or OTM participant 221 may be converted to an active participant 216 during the course of an ongoing discussion. For example, an OTM participant 221 asks a particularly insightful question and the active participants 216 may vote to convert the OTM participant 221 into an active participant 216.

Participants may be converted to a different type of participant or restricted from a discussion completely (e.g., exclude or "bounce" a participant). For example, VMS 147 may determine that a participant should be bounced and automatically restrict some or all of a participant's permissions associated with the discussion. An active participant 216 may have a control 210 that initiates an action to convert a selected active participant 216 to a passive participant 226 or to "bounce" a participant, permanently or temporarily eliminating them from any type of participation in the discussion. In various embodiments, a participant is bounced according to a rule associated with the discussion. For example, an active participant 216 wishes to bounce a second active participant, so the remaining active participants are prompted to vote whether to bounce the second active participant. This functionality is useful in some discussion scenarios to provide participants with a productive, efficient, and/or pleasant experience within the discussion.

A discussion or "virtual meeting" may be created or initiated in a variety of methods. In various embodiments, a group of users agree to set up a discussion. User 105 sets up the discussion by specifying parameters such as number of active participants, number of passive participants, category, topic, start time, end time, public, private or semi-private, number of total participants, invitation list, participant exclusion rules, participation rules, participation types, number of quasi-active participants, meeting type, topic, agenda, time etc. In various embodiments, the user schedules the discussion for a future date and time, for multiple dates and times and/or on a recurring basis. User 105 may specify that the discussion be open to the public, completely private or a mixture of the two. For instance, user 105 may open a discussion with "Ohio State sports" as the topic and wait for other interested participants to join. In another example, user 105 is a doctor and initiates a discussion that is limited to only one other participant at a time. In various embodiments, user 105 may wish to conduct a discussion with a specified set of active participants, without limiting the number or identity of the passive participants. For example, user 105 who is an Ohio State sports fan may specify six active participants by entering the user names of two other Ohio State fans and the user names of three Michigan fans, while placing no restriction on the identity of the passive participants.

In various embodiments, VMS 115 accumulates and tracks user ratings and shows the user ratings on a user ratings indicator 260. User ratings may include interaction ratings 262, community ratings 264, etc. For example, VMS 115 may measure the value or extent to which a user participates in and/or provides value to a particular virtual meeting by accumulation of a user interaction rating 262. In various embodiments, VMS 115 helps to ensure that users remain engaged in a virtual meeting by allowing a user to accumulate user interaction points. VMS 115 may periodically place an icon or graphic on a user's 105 UI 201 for a temporary duration. The frequency of such periodic placement may be pre-determined (e.g. configurable) or may occur randomly. If the user selects the icon, then VMS 115 increases (e.g., adds points) to that user's user interaction rating 262. If the duration expires and the user fails to select the icon, then VMS 115 may decrease (e.g., subtract points) from the user interaction rating 262 and/or bounce the user from the virtual discussion. VMS 115 may accumulate and track a community rating 264 for users 105. The community rating 264 may increase for behavior that is desirable to the virtual meeting community and the community rating 264 may decrease for behavior that is undesirable. For example, in various embodiments, VMS 115 may increase a user's community rating 264 if a user: hosts a meeting, participates in meeting, is an active participant, provides input to a meeting, provides quality input to a meeting, receives positive feedback from a second user, etc. A quantity of increase in the user interaction rating 262 may vary or be determined based upon at least one of: an amount of the first input, a type of the first input, a participant type and a participant area associated with the first user. In various embodiments, VMS 115 may decrease a user's community rating 264 if a user is bounced from a meeting, receives negative feedback, schedules a meeting but fails to attend it, provides objectionable input, etc.

VMS 115 manages audio input and output of a virtual meeting. In various embodiments, VMS 115 or one of its subcomponents (e.g. VMP 147) receives a plurality of inputs from a plurality of meeting participants. For example, the inputs are received from a plurality of client devices. VMS 115 analyzes the inputs (e.g., via Audio Analysis 165) and identifies a number of audio inputs 170. In various embodiments, VMS 115 mixes a number of audio inputs 170 (e.g., via Audio Mixing 155) into a single audio output 160.

VMS analyzes the audio inputs 170 and determines which input indicates a participant is speaking and provides output 160 to the UIs 201 of the meeting participants to indicate who the current speaker is. This provides valuable functionality to an audio-based meeting, since the meeting participants have a positive identification of who is speaking and are not forced to guess who the speaker is. In various embodiments, VMS 115 analyzes the audio inputs 170 and measures the amplitude associated with each input 170. VMS 115 identifies the largest amplitude and identifies the currently speaking user as the user 105 associated with the audio input 170 having that largest amplitude. In various embodiments, VMS 115 updates a currently speaking indicator 240 based upon the currently speaking user.

In various embodiments, VMS 115 continuously determines from a plurality of inputs 170, a first subset of users from the meeting participants who are sending input to the computer and continuously updates, based upon the continuously determining, a subset of user input indicators corresponding to the first subset of users.

In various embodiments, VMS 115 analyzes the plurality of inputs 170 to identify a speaking user by matching each audio input with a user (i.e., a meeting participant). VMS 115 determines an amplitude of each audio input 170 in the plurality of audio inputs and creates, based upon the determined amplitude, audio amplitude user data that includes a plurality of audio amplitude indicators 245 each associated with a user. VMS 115 appends the audio amplitude user data to the audio output 160. In various embodiments, VMS 115 sends the audio output 160 to the plurality of user interfaces of the users participating in the meeting and the user interfaces depict the audio amplitude user data. For example, the user interface may depict a plurality of icons each associated with a user and that user's audio amplitude indicator 245. In various embodiments, the user interface may be configured to depict the user and that user's audio amplitude indicator 245 by varying the icon based upon the associated audio amplitude indicator 245. For example, the user interface may configure the icon by blinking, varying color, varying brightness, varying size, and varying a numeric indicator associated with the icon.

UI 201 may be configured to send VMS 115 input in a variety of transmission or internet protocols. For example, in various embodiments, UI 201 may format audio data and send it via user datagram protocol (UDP) and format and send video data via transmission control protocol (TDP). The ability for UI 201 to send, and for VMS to receive, data in a variety of protocols in beneficial in managing bandwidth usage.

As discussed previously, VMS 115 may include a functionality limit or eliminate ("bounce") users from a virtual meeting. In various embodiments, VMS 115 receives an exclusion request to exclude a particular user from participation in a virtual meeting, VMS 115 sends a poll request to the plurality of meeting participants and receives a plurality of responses to the poll request. Based upon the plurality of responses, VMS 115 removes or limits at least a portion of permissions associated with the user and for the particular virtual meeting. In various embodiments, bouncing a user may include removing the portion of permissions comprises moving the second user to a different participant area of the virtual meeting.

As discussed above in association with FIG. 2, VMS 115 generates a variety of UIs 201 and a variety of controls, information and indicators for display on the various UIs 201. For example, VMS 115 may generate UIs 201 including one or more of an interactive reward icon 235, currently speaking indicator 240, audio amplitude indicator 245, queue indicator 250, roster indicator 255 and/or user ratings indicator 260. In various embodiments, the plurality of user interfaces (i.e. UI 201) comprises a queue indicator 250 configured to display users that are waiting "in line" during the virtual meeting. Queues may be for waiting to receive different permissions associated with the virtual meeting, waiting to move to a stage area of the virtual meeting, etc. For example, an active participant 216 may wish to view the users 105 that are waiting to become an active participant in the virtual meeting (e.g., waiting to get "on stage"). VMS 115 may enable a user 105 to sort the queue based upon a user rating. For example, in various embodiments, a user 105 (or a subset of users 105) may be enabled to reorder a queue and/or select a user out of the queue to move to the stage 215; such a user 105 may sort the queue based upon the user rating. In various embodiments, VMS 115 may enable UIs to display information regarding the number, type and identify of users in the various participation areas of a virtual meeting. VMS 115 may generate indicators showing a roster of users 105 that are on stage 215, in the audience 225, on the MIC 220, etc.

In various embodiments, VMS 115 enables push-to-talk functionality. For instance, when participating in a virtual meeting, it may not be convenient to constantly enable and disable a mute control. As such, some users may allow background noise to be transmitted, thus providing interference and distraction to other meeting participants. In various embodiments, VMS 115 includes a push-to-talk control 230 for display on UI 205. In response to activation of the push-to-talk control 230, UI user interface sends audio input but otherwise (i.e., when push-to-talk is not being pushed) does not allow the sending of any audio input to VMS 115.

As one skilled in the art will appreciate, in various embodiments, the identity of participants may be specified by user id, membership in a group, age, user rating, geographic location, certification or credential. Such identification of users is also useful to eliminate or restrict users from participation in a discussion. In various embodiments, participants in a discussion may elect to create or "spawn" an additional discussion. A new discussion is created with the option of copying the parameters (e.g. topic, category, privacy settings, number of active participants, etc.) of the original discussion.

In various embodiments, user 105 visits a virtual meeting place portal (e.g., a web portal provided by VMP 115) and solicits a discussion, sets up a new discussion, reviews the schedule of discussions and/or searches ("scans") active discussions. User 105 may scan for scheduled and/or active discussions based upon a variety of factors such as topic, participant, discussion rating, etc. For example, user 105 may search for a discussion in which a friend is an active participant and choose to join that discussion. In various embodiments, user 105 scans the active discussions by accessing a scan function (e.g., by selecting a scan button control 210) on the web portal. User 105 may choose to scan all active discussions or a subset of discussions (e.g., scan sports related discussions), VMP Engine 147 executes logic to iterate thru the discussions, sending data associated with a particular discussion, such as audio data stream of a discussion, to user's 105 client 110 for a predetermined period of time (e.g., 10 seconds). In various embodiments, discussion topics may be associated with different "rooms" or "auditoriums." For instance, the virtual meeting place portal is organized similar to a convention center and user 105 may scan for rooms where an active discussion is taking place.

While the steps outlined above represent specific embodiments of the disclosure, practitioners will appreciate that there are any number of computing algorithms and user interfaces that may be applied to create similar results. The steps are presented for the sake of explanation only and are not intended to limit the scope of the disclosure in any way. Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims of the disclosure.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

It should be understood that the detailed description and specific examples, indicating exemplary embodiments of the disclosure, are given for purposes of illustration only and not as limitations. Many changes and modifications within the scope of the instant disclosure may be made without departing from the spirit thereof, and the disclosure includes all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more," Moreover, when a phrase similar to "at least one of A, B, or C" or "at least one of A, B, and C" is used in the claims or the specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

The invention claimed is:

1. A method, comprising:
    enabling, by a virtual meeting computer, a virtual meeting comprising online interaction among a plurality of meeting participants;
    periodically generating, by the computer, an interaction reward icon for display on a first user interface of a first user in the plurality of meeting participants,
    wherein the interaction reward icon is randomly displayed for a temporary duration,
    wherein selecting the interaction reward icon results in an increase in a user interaction rating,
    wherein a plurality of user interfaces comprises the first user interface;
    in response to the generating the interaction reward icon, displaying the interaction reward icon;
    receiving, by the computer and from the first user, a selection of the displayed interaction reward icon;
    in response to the receiving the selection, increasing, by the computer, the user interaction rating associated with the first user;
    receiving, by the virtual meeting computer, a scan request via a scan control of the first user interface, wherein the scan request includes a request to search for a subset of meetings related to a first topic and a meeting within the subset of meetings where certain multiple participants exist; and
    while iterating, by the virtual meeting computer and based upon the scan request, through a plurality of active meetings, wherein the iterating comprises providing first audio data associated with a first meeting to a user device of the first user for a predetermined period of time and, in response to the first predetermined period of time expiring, providing second audio data associated with a second meeting to the user device of the first user for the predetermined period of time, continuing to periodically generate the interaction reward icon.

2. The method of claim 1, further comprising, in response to a duration of time expiring without receiving the selection of the interaction reward icon, removing the displayed interaction reward icon.

3. The method of claim 1, further comprising generating, by the computer, a push-to-talk control on a second user interface, wherein the second user interface is configured in a mode where audio input is not continuously sending by the second user interface, wherein in response to activation of the push-to-talk control, the second user interface immediately sends audio input.

4. The method of claim 3, further comprising receiving first input of a plurality of inputs from the first user and increasing, based upon the first input, the user interaction rating associated with the first user.

5. The method of claim 4, wherein a quantity of the increase in the user interaction rating varies based upon at least one of: the amount of the first input, the type of the first input, the participant type, the participant status, the participant affiliation or the participant area associated with the first user.

6. The method of claim 5, wherein the participant area is one of a plurality of participant areas comprising: a stage area, an audience area and a queue area.

7. The method of claim 6, further comprising receiving an exclusion request to exclude a second user from participation in the virtual meeting, and sending a poll request to the plurality of meeting participants.

8. The method of claim 7, further comprising decreasing, based upon the plurality of responses to the poll request, a user interaction rating associated with the second user.

9. The method of claim 1, further comprising, in response to desirable behavior by the first user, increasing, by the computer, a community rating associated with the first user.

10. The method of claim 9, wherein desirable behavior includes at least one of the first user hosts the virtual meeting, the first user participates in the virtual meeting, the first user is an active participant in the virtual meeting, the first user provides input to the virtual meeting, the first user provides quality input to the virtual meeting, or the first user receives positive feedback from a second user, and wherein an amount of the increasing of the community rating is based on at least one of an amount of input by the first user, a type of input by the first user, a participant type of the first user and a participant area associated with the first user.

11. The method of claim 9, further comprising, in response to undesirable behavior by the first user, decreasing, by the computer, a community rating, wherein the undesirable behavior includes at least one of the first user being bounced from the virtual meeting, the first user receiving negative feedback, the first user scheduling the virtual meeting but failing to attend, or the first user providing objectionable input.

12. The method of claim 1, further comprising:
    mixing a plurality of audio inputs into an audio output and sending the audio output to the plurality of user interfaces;
    analyzing the plurality of audio inputs to identify a speaking user; and
    updating a currently speaking indicator on the plurality of user interfaces.

13. The method of claim 12, wherein the analyzing the plurality of audio inputs to identify the speaking user comprises:
    matching each audio input in the plurality of audio inputs with a user in the plurality of meeting participants;
    determining an amplitude of each audio input in the plurality of audio inputs;
    creating, based upon the determining, audio amplitude user data comprising a plurality of audio amplitude indicators associated with each user in the plurality of users, wherein the audio output comprises the audio amplitude user data.

14. The method of claim 13, wherein the updating the currently speaking indicator on the plurality of user interfaces comprises sending the audio amplitude user data to the plurality of user interfaces, wherein the plurality of user interfaces displays the audio amplitude user data.

15. The method of claim 14, further comprising displaying the audio amplitude user data as a plurality of icons, wherein each icon is associated with a meeting participant and an associated audio amplitude indicator.

16. The method of claim 15, wherein a depiction of each icon in the plurality of icons is configured to vary, based upon the associated audio amplitude indicator.

17. The method of claim 16, wherein the depiction comprises at least one of varying color, varying brightness, varying size, or varying a numeric indicator.

18. The method of claim 17, further comprising:
continuously determining, by the computer and from the plurality of inputs, a first subset of users from the meeting participants who are sending input to the computer; and
continuously updating, by the computer and based upon the continuously determining, a subset of the displayed audio amplitude icons associated with the first subset of users on the first user interface.

19. The method of claim 18, wherein each audio input of the plurality of inputs further comprises video input, wherein the audio input and the video input are each formatted according to different transmission protocols and are each associated with a different bandwidth requirement.

20. The method of claim 19, wherein the plurality of user interfaces comprises a queue indicator configured to display meeting participants that are at least one of waiting to receive different permissions associated with the virtual meeting or waiting to move to the stage area of the virtual meeting.

21. The method of claim 20, wherein the plurality of user interfaces comprises a roster indicator to view a roster associated with the virtual meeting, wherein a stage roster, an audience roster and a queue roster include requests for display of the meeting participants in the stage area, the audience area and the queue area, respectively.

22. The method of claim 21, further comprising sorting, by the computer and in response to a sort request by a requesting user, the roster associated with the requesting user, based upon a user rating associated with each user of the plurality of meeting participants.

23. The method of claim 22, wherein the plurality of user interfaces comprises a plurality of user rating indicators configured to display the user rating for each user in the plurality of meeting participants.

24. The method of claim 23, wherein the user rating is based upon at least one of the user interaction rating associated with the user or the community interaction rating associated with the user.

25. A virtual meeting system comprising:
a network interface communicating with a tangible memory;
the tangible memory communicating with a hardware processor; and
the tangible memory having instructions stored thereon that, in response to execution by the processor, cause the processor to perform operations comprising:
enabling, by the processor, a virtual meeting comprising online interaction among a plurality of meeting participants;
periodically generating, by the processor, an interaction reward icon for display on a first user interface of a first user in the plurality of meeting participants,
wherein the interaction reward icon is randomly displayed for a temporary duration,
wherein selecting the interaction reward icon directly results in an increase in a user interaction rating,
wherein a plurality of user interfaces comprises the first user interface;
in response to the generating the interaction reward icon, displaying the interaction reward icon;
receiving, by the processor and from the first user, a selection of the displayed interaction reward icon;
in response to the receiving the selection, increasing, by the processor, the user interaction rating associated with the first user;
receiving, by the processor, a scan request via a scan control of the first user interface, wherein the scan request includes a request to search for a subset of meetings related to a first topic and a meeting within the subset of meetings where certain multiple participants exist; and
while iterating, by the processor and based upon the scan request, through a plurality of active meetings, wherein the iterating comprises providing first audio data associated with a first meeting to a user device of the first user for a predetermined period of time and, in response to the first predetermined period of time expiring, providing second audio data associated with a second meeting to the user device of the first user for the predetermined period of time, continuing to periodically generate the interaction reward icon.

26. A non-transitory tangible computer-readable medium having computer-executable instructions stored thereon that, if executed by a computer, cause the computer to perform operations comprising:
enabling, by the computer, a virtual meeting comprising online interaction among a plurality of meeting participants;
periodically generating, by the computer, an interaction reward icon for display on a first user interface of a first user in the plurality of meeting participants,
wherein the interaction reward icon is randomly displayed for a temporary duration,
wherein selecting the interaction reward icon directly results in an increase in a user interaction rating,
wherein a plurality of user interfaces comprises the first user interface;
in response to the generating the interaction reward icon, displaying the interaction reward icon;
receiving, by the computer and from the first user, a selection of the displayed interaction reward icon;
in response to the receiving the selection, increasing, by the computer, the user interaction rating associated with the first user;
receiving, by the computer, a scan request via a scan control of the first user interface, wherein the scan request includes a request to search for a subset of meetings related to a first topic and a meeting within the subset of meetings where certain multiple participants exist; and
while iterating, by the computer and based upon the scan request, through a plurality of active meetings, wherein the iterating comprises providing first audio data associated with a first meeting to a user device of the first user for a predetermined period of time and, in response to the first predetermined period of time expiring, providing second audio data associated with a second meeting to the user device of the first user for the predetermined period of time, continuing to periodically generate the interaction reward icon.

* * * * *